United States Patent
Imai et al.

(12) 
(10) Patent No.: US 6,459,012 B1
(45) Date of Patent: Oct. 1, 2002

(54) METHOD FOR TREATING ORGANOHALOGEN COMPOUND-CONTAINING SOIL OR ASH

(75) Inventors: Tomoyuki Imai, Hiroshima (JP); Satoshi Hatakeyama, Hiroshima-ken (JP); Toshiki Matsui, Hiroshima (JP); Yasuhiko Fujii, Otake (JP); Tomoko Okita, Hatsukaichi (JP); Toshiyuki Hakata, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/953,442

(22) Filed: Sep. 17, 2001

(30) Foreign Application Priority Data

Sep. 22, 2000 (JP) ......................................... 2000-289482

(51) Int. Cl.⁷ .................................................. A62D 3/00
(52) U.S. Cl. ....................... 588/206; 588/207; 588/209; 588/213; 405/128.8
(58) Field of Search ................................ 588/205, 206, 588/207, 209, 213, 228; 405/128.1, 128.15, 128.45, 128.5, 128.7, 128.75

(56) References Cited

U.S. PATENT DOCUMENTS 5,951,852 A * 9/1999 Fookes .................... 208/262.1

FOREIGN PATENT DOCUMENTS

| DE | 19903986 A1 | * | 8/2000 | ............ A62D/3/00 |
| EP | 387417 A | * | 9/1990 | ............ A62D/3/00 |
| EP | 875587 A1 | * | 11/1998 | ............ C22B/1/16 |

* cited by examiner

Primary Examiner—Stanley S. Silverman
Assistant Examiner—Eileen E. Nave
(74) Attorney, Agent, or Firm—Nixon & Vanderhye P.C.

(57) ABSTRACT

A process for treating an organohalogen compound-containing soil or ash of the present invention, comprises:

mixing the organohalogen compound-containing soil or ash with an organohalogen compound-decomposition catalyst composed of a composite catalyst comprising an amine compound and iron compound particles, and having an average particle size of 0.01 to 2.0 $\mu$m, a phosphorus content of not more than 0.02% by weight, a sulfur content of not more than 0.3% by weight and a sodium content of not more than 0.3% by weight; and having an apparent density ($\rho a$) of not more than 0.8 g/ml and a catalytic activity capable of decomposing not less than 50% by weight of monochlorobenzene; and heat-treating the obtained mixture at a temperature of 150 to 600° C. The method for treating an organohalogen compound-containing soil or ash in order to effectively decompose dioxins and dioxin precursors such as aromatic organohalogen compounds or aliphatic organohalogen compounds, e.g., trichloroethylene and dichloromethane, which are contained in the soil or ash.

13 Claims, No Drawings

METHOD FOR TREATING ORGANOHALOGEN COMPOUND-CONTAINING SOIL OR ASH

BACKGROUND OF THE INVENTION

The present invention relates to a method for treating soil or ash containing organohalogen compounds, and more particularly, to a method for treating an organohalogen compound-containing soil or ash in order to effectively decompose dioxins and dioxin precursors such as aromatic organohalogen compounds or aliphatic organohalogen compounds, e.g., trichloroethylene and dichloromethane, which are contained in the soil or ash.

Exhaust gases, fly ashes and deposited ashes generated from an incinerator upon burning municipal solid wastes and industrial wastes therein, contain dioxins which are aromatic halogen compounds showing an extremely strong toxicity to human bodies, though the contents thereof are very small. The dioxins generally include compounds having such a structure that hydrogen atoms of dibenzo-p-dioxine, dibenzofuran, etc. are substituted with chlorine atoms.

Also, the aliphatic organohalogen compounds such as trichloroethylene and tetrachloroethylene have been extensively used in many applications such as degreasing of metals, dry-cleaning and the like.

The organohalogen compounds have caused significant environmental problems such as air pollution due to discharge thereof into atmospheric air, and contamination of ground water and soils upon disposal thereof, because these compounds are difficult to decompose and show carcinogenesis. In particular, ashes discharged from incinerators or soils contaminated with wastes have a high content of the organohalogen compounds. Therefore, it has been required to decompose these organohalogen compounds and convert these compounds into harmless ones. Although various methods for removing the organohalogen compounds have been conventionally proposed, satisfactory techniques capable of decomposing the organohalogen compounds and converting these compounds into harmless ones in economical and effective manner, have not been established.

Hitherto, various techniques for decomposing organohalogen compounds contained in soils or ashes and converting these compounds into harmless ones have been reported. For example, there are known a method of decomposing poly-halogenated aromatic compounds having at least five carbon atoms by heating at a temperature of 200 to 550° C. in the presence of a catalyst such as iron oxide (Japanese Patent Publication (KOKOKU) No. 6-38863(1994)); a method of removing halogenated aromatic compounds or the like from an exhaust gas or reducing amounts thereof by heat-treating at a temperature of 300 to 700° C. in the presence of a catalyst containing iron oxide (Japanese Patent Application Laid-Open (KOAKI) No. 2-280816(1990)); a method of introducing an inhibitor for preventing the generation of dioxins composed of an amine-carrying activated carbon, into an exhaust gas passing through flues of an incinerator (Japanese Patent Application Laid-Open (KOAKI) No. 11-9960(1999)); a method of mixing ashes to be treated, and a dechlorinating agent, and then heat-treating the resultant mixture (Japanese Patent Application Laid-Open (KOAKI) No. 11-19616(1999)); a method of decomposing organohalogen compounds in the presence of oxygen using a solid catalyst containing iron oxide, etc. and/or titanium dioxide as base components (Japanese Patent Application Laid-Open (KOAKI) Nos. 11-188235(1999) and 11-188236(1999)); a method of adding phosphorous acids, hypophosphorous acids with an aluminum compound, and/or a titanium compound to solid wastes and then heat-treating the resultant mixture (Japanese Patent Application Laid-Open (KOAKI) No. 11-290824(1999)); or the like.

In addition, there are also known an iron compound catalyst having a specific catalytic activity, and a method of spraying the iron compound catalyst into a combustion chamber of an incinerator in order to prevent the generation of dioxins (Japanese Patent Application Laid-Open (KOAKI) No. 11-267507(1999)).

However, although it has been presently required to provide an process for decomposing the organohalogen compounds contained in soils or ashes and converting these compounds into harmless ones, the methods described in the above publications are still unsatisfactory.

Namely, in the method described in Japanese Patent Publication (KOKOKU) No. 6-38863(1994), poly-halogenated compounds which are contained in fly ashes generated in an incinerator or solid wastes are decomposed under an oxygen-lack atmosphere or an inert gas atmosphere in a non-pass-through-type or closed-type apparatus using fly ashes, metals, metal oxides containing iron oxide, carbonates, silicates and the like as a catalyst. However, this method must be performed under the specific conditions, i.e., under the closed system or the inert gas atmosphere, thereby requiring large-scale apparatuses with high airtightness as well as high costs for installation and maintenance thereof. Therefore, the above method is unsatisfactory from industrial viewpoints.

In the method described in Japanese Patent Application Laid-Open (KOAKI) No. 11-19616(1999), after incineration ashes, fly ashes or the like are mixed with a dechlorinating agent composed of alkali substances, the resultant mixture is heat-treated. In this method, it is required to contact chlorine-containing gases generated by heating the wastes to be treated, with the alkali substances. Thus, the wastes to be treated must be heated to an elevated temperature in order to generate the chlorine-containing gases. Namely, the method is not directly concerned with such techniques for decomposing the organohalogen compounds and converting these compounds into harmless ones. Therefore, the above method is also unsatisfactory to convert dioxins into harmless compounds.

In the method described in Japanese Patent Application Laid-Open (KOAKI) No. 11-9960(1999), the amine-carrying activated carbon is introduced into exhaust gases containing dioxins in order to adsorb the dioxins in the activated carbon by high adsorptivity of the activated carbon, and then react the dioxins with the amine compound for decomposition of the dioxins. The amine-carrying activated carbon exhibits a high dioxin-adsorptivity, but is insufficient in dioxin-decomposition activity. Further, the activated carbon cannot sufficiently prevent the generation of dioxins. Also, the activated carbon tends to be ignitable and flammable when heated to an elevated temperature. Therefore, the above method is undesirable in view of safety.

In the method described in Japanese Patent Application Laid-Open (KOAKI) Nos. 11-188235(1999) and 11-188236 (1999), organohalogen compounds contained in gases are decomposed in the presence of oxygen using a solid catalyst containing iron oxide, etc. and/or titanium dioxide as base components. Thus, the organohalogen compounds treated by the method are only those contained in gases, the above method is unsatisfactory for decomposing organohalogen compounds contained in solids.

In the method described in Japanese Patent Application Laid-Open (KOAKI) No. 11-290824(1999), there is used a treating agent containing phosphorous acids and hypophosphorous acids. As shown in Comparative Examples below, the treating agent is poor in dioxin-decomposition percentage. Therefore, the above method is also unsatisfactory for decomposing dioxins.

Further, the catalyst described in Japanese Patent Application Laid-Open (KOAKI) No. 11-267507(1999), is effective to reduce the amount of dioxins contained in soils or ashes. However, the activity of the catalyst is still unsatisfactory as shown in Comparative Examples below.

As a result of the present inventors' earnest studies for solving the above problems, it has been found that by mixing organohalogen compound-containing soil or ash with a specific organohalogen compound-decomposition catalyst and then heat-treating the resultant mixture at a temperature of 150 to 600° C., it is possible to effectively decompose dioxins or dioxin precursors contained in the soil or ash. The present invention has been attained on the basis of this finding.

SUMMARY OF THE INVENTION

It is an object of the present invention to provide a method for effectively treating an organohalogen compound-containing soil or ash using a simple apparatus without specifying a gas atmosphere, in order to decompose dioxins as well as dioxin precursors such as aromatic organohalogen compounds and aliphatic organohalogen compounds, e.g., trichloroethylene, dichloromethane or the like, which are contained in the soil or ash.

To accomplish the aim of the present invention, there is provided a process for treating an organohalogen compound-containing soil or ash, comprising:

mixing the organohalogen compound-containing soil or ash with an organohalogen compound-decomposition catalyst composed of a composite catalyst comprising an amine compound and iron compound particles, and having an average particle size of 0.01 to 2.0 $\mu$m, a phosphorus content of not more than 0.02% by weight, a sulfur content of not more than 0.3% by weight and a sodium content of not more than 0.3% by weight; and having an apparent density ($\rho$a) of not more than 0.8 g/ml and a catalytic activity capable of decomposing not less than 50% by weight of monochlorobenzene when 50 mg of the organohalogen compound-decomposition catalyst is heat-treated at 300° C. for 60 minutes in air and then instantaneously contacted with $5.0 \times 10^{-7}$ mol of monochlorobenzene at 300° C. at a space velocity of 150,000 $h^{-1}$ in an inert gas atmosphere using a pulse catalytic reactor; and heat-treating the obtained mixture at a temperature of 150 to 600° C.

In a second aspect of the present invention, there is provided a process for treating an organohalogen compound-containing soil or ash, comprising:

mixing 100 parts by weight of the organohalogen compound-containing soil or ash with 0.1 to 100 parts by weight of an organohalogen compound-decomposition catalyst composed of a composite catalyst comprising 0.01 to 10 parts by weight of an amine compound having a boiling point of not less than 150° C., and 100 parts by weight of iron compound particles, and having an average particle size of 0.01 to 2.0 $\mu$m, a phosphorus content of not more than 0.02% by weight, a sulfur content of not more than 0.3% by weight and a sodium content of not more than 0.3% by weight; and having an average particle size of 0.01 to 2.0 $\mu$m, an apparent density ($\rho$a) of not more than 0.8 g/ml and a catalytic activity capable of decomposing not less than 50% by weight of monochlorobenzene when 50 mg of the organohalogen compound-decomposition catalyst is heat-treated at 300° C. for 60 minutes in air and then instantaneously contacted with $5.0 \times 10^{-7}$ mol of monochlorobenzene at 300° C. at a space velocity of 150,000 $h^{-1}$ in an inert gas atmosphere using a pulse catalytic reactor; and heat-treating the obtained mixture at a temperature of 150 to 600° C. under an air flow.

In a third aspect of the present invention, there is provided a process for treating an organohalogen compound-containing soil or ash, comprising:

mixing 100 parts by weight of an organohalogen compound-containing soil or ash with 0.1 to 100 parts by weight an organohalogen compound-decomposition catalyst by a dry mixing method using a sand mill, a Henschel mixer, a concrete mixer or a Nauter mixer, or by a semi-dry mixing method using a sand mill, a Henschel mixer, a concrete mixer, a Nauter mixer or a single-screw or twin-screw kneader-type mixer;

the organohalogen compound-decomposition catalyst being composed of a composite catalyst comprising 0.01 to 10 parts by weight of an amine compound having a boiling point of not less than 150° C. and 100 parts by weight of iron compound particles, and having an average particle size of 0.01 to 2.0 $\mu$m, a phosphorus content of not more than 0.02% by weight, a sulfur content of not more than 0.3% by weight and a sodium content of not more than 0.3% by weight; and having an average particle size of 0.01 to 2.0 $\mu$m, an apparent density ($\rho$a) of not more than 0.8 g/ml and a catalytic activity capable of decomposing not less than 50% by weight of monochlorobenzene when 50 mg of the organohalogen compound-decomposition catalyst is heat-treated at 300° C. for 60 minutes in air and then instantaneously contacted with $5.0 \times 10^{-7}$ mol of monochlorobenzene at 300° C. at a space velocity of 150,000 $h^{-1}$ in an inert gas atmosphere using a pulse catalytic reactor; and heat-treating the obtained mixture at a temperature of 150 to 600° C. under an air flow using a continuous- or batch-type rotary kiln, multiple-hearth furnace or a batch continuous-type pressure furnace.

DETAILED DESCRIPTION OF THE INVENTION

The present invention will now be described in detail below.

First, an organohalogen compound-decomposition catalyst used in the method of the present invention is described.

The organohalogen compound-decomposition catalyst used in the method of the present invention is constituted by a composite catalyst comprising iron compound particles and an amine compound.

The iron compound particles used in the present invention have an average particle size of usually 0.01 to 2.0 $\mu$m, preferably 0.02 to 2.0 $\mu$m, more preferably 0.02 to 1.0 $\mu$m.

When the average particle size of the iron compound particles is more than 2.0 $\mu$m, the contact efficiency between the obtained decomposition catalyst and the organohalogen compounds is deteriorated, so that the decomposition catalyst may fail to show a sufficient organohalogen compound-decomposition activity. The mass-production of the iron compound particles having an average particle size of less than 0.01 $\mu$m, is industrially difficult. Further, a large amount of energy is required to pulverize agglomerated particles produced by a large coagulation force between too fine particles. Therefore, the use of such fine iron compound particles becomes difficult practically.

The iron compound particles used in the present invention, have a BET specific surface area of usually 0.2 to 200 m²/g, preferably 1.0 to 200 m²/g, more preferably 2.0 to 150 m²/g.

As the iron compound particles used in the present invention, there may be exemplified iron oxide hydroxide particles such as goethite, akaganeite and lepidocrocite; and iron oxide particles such as hematite, maghemite and magnetite. These iron compound particles may be used alone or in combination of any two or more thereof. Among these iron compound particles, goethite particles, hematite particles and magnetite particles are preferred, and goethite particles and hematite particles are more preferred.

The iron compound particles used in the present invention may be granular particles having either a spherical shape, a cubical shape, an octahedral shape, a hexahedral shape and a polyhedral shape, or acicular particles having either an needle-like shape, a spindle shape or a rice-grain shape. Among these particles, spindle-shaped particles or acicular particles are preferred.

The iron compound particles used in the present invention, have a phosphorus content of usually not more than 0.02% by weight, preferably not more than 0.01% by weight, more preferably not more than 0.005% by weight based on the weight of the particles. When the phosphorus content is more than 0.02% by weight, since the catalyst poison ability of the phosphorus becomes large, the catalytic activity for the decomposition of the organohalogen compounds may be deteriorated.

The iron compound particles used in the present invention, have a sulfur content of usually not more than 0.3% by weight, preferably not more than 0.1% by weight, more preferably not more than 0.07% by weight based on the weight of the particles. When the sulfur content is more than 0.3% by weight, since the catalyst poison ability of the sulfur becomes large, the catalytic activity for the decomposition of the organohalogen compounds may be deteriorated.

The iron compound particles used in the present invention, have a sodium content of usually not more than 0.3% by weight, preferably not more than 0.2% by weight, more preferably not more than 0.15% by weight based on the weight of the particles. When the sodium content is more than 0.3% by weight, since the catalyst poison ability of the sodium becomes large, the catalytic activity for decomposition of the organohalogen compounds may be deteriorated.

Further, the iron compound particles used in the present invention, have a total content of phosphorus, sulfur and sodium of preferably not more than 0.5% by weight, more preferably not more than 0.3% by weight, still more preferably not more than 0.2% by weight based on the weight of the particles. When the total content of phosphorus, sulfur and sodium is more than 0.5% by weight, the catalytic activity for decomposition of the organohalogen compounds may be deteriorated.

The iron compound particles used in the present invention exhibit a catalytic activity capable of decomposing not less than 20% of monochlorobenzene when measured by the following method. That is, 50 mg of iron oxide particles obtained by heat-treating the above iron compound particles at 300° C. for 60 minutes in air, is instantaneously contacted with $5.0 \times 10^{-7}$ mol of monochlorobenzene at 300° C. at a hourly space velocity of 150,000 h$^{-1}$ in an inert gas atmosphere using a pulse catalytic reactor to determine the percentage of the monochlorobenzene decomposed.

In case of composite catalyst produced by using the iron compound particles having the decomposition activity of monochlorobenzene of less than 20%, the aimed effects of the present invention cannot be obtained. The iron compound particles have a catalytic activity capable of decomposing monochlorobenzene of preferably not less than 25%, more preferably not less than 30%. That is, 50 mg of the iron compound particles are heat-treated at 300° C. for 60 minutes in air and then instantaneously contacted with $5.0 \times 10^{-7}$ mol of monochlorobenzene at 300° C. at a hourly space velocity of 150,000 h$^{-1}$ in an inert gas atmosphere using a pulse catalytic reactor to determine the percentage of the monochlorobenzene decomposed.

Examples of the amine compound used in the present invention may include alkylamines such as diethylenetriamine and triethylenetetramine; alkanolamines such as triethanolamine and diethanolamine; cyclic amines such as aniline; or the like. These amine compounds may be used alone or in combination of any two or more thereof.

The amine compound used in the present invention has a boiling point of usually not less than 150° C. When the boiling point of the amine compound is less than 150° C., the amine compound tends to be vaporized when treating the organohalogen compounds therewith, so that the obtained organohalogen compound-decomposition catalyst may fail to show the aimed effects of the present invention.

The organohalogen compound-decomposition catalyst of the present invention has substantially the same particle shape, particle size and the content of the impurities such as phosphorus, sulfur, sodium or the like as those of the iron compound particles used. More specifically, the organohalogen compound-decomposition catalyst has an average particle size of usually 0.01 to 2.0 μm, preferably 0.02 to 2.0 μm, more preferably 0.02 to 1.0 μm. The organohalogen compound-decomposition catalyst has a phosphorus content of usually not more than 0.02% by weight, preferably not more than 0.01% by weight, more preferably not more than 0.005% by weight based on the weight of the composite particles. The organohalogen compound-decomposition catalyst has a sulfur content of usually not more than 0.3% by weight, preferably not more than 0.1% by weight, more preferably not more than 0.07% by weight based on the weight of the composite particles. The organohalogen compound-decomposition catalyst has a sodium content of usually not more than 0.3% by weight, preferably not more than 0.2% by weight, more preferably not more than 0.15% by weight based on the weight of the composite particles. The organohalogen compound-decomposition catalyst has have a total content of phosphorus, sulfur and sodium of preferably not more than 0.5% by weight, more preferably not more than 0.3% by weight, still more preferably not more than 0.2% by weight based on the weight of the composite particles.

Also, the organohalogen compound-decomposition catalyst of the present invention has an apparent density (ρa) of usually not more than 0.8 g/ml, preferably not more than 0.6 g/ml. When the apparent density of the organohalogen compound-decomposition catalyst is more than 0.8 g/ml, the pulverization of agglomerated particles may be insufficiently conducted, so that it is difficult to intimately mix the organohalogen compound-decomposition catalyst with materials to be treated.

The organohalogen compound-decomposition catalyst of the present invention has a BET specific surface area of preferably 0.2 to 200 m²/g, more preferably 1.0 to 200 m²/g, still more preferably 2.0 to 150 m²/g.

The amount of the amine compound contained in the organohalogen compound-decomposition catalyst is preferably 0.01 to 10 parts by weight, more preferably 0.05 to 5.0 parts by weight based on the weight of the iron compound particles. When the content of the amine compound is less than 0.01 part by weight, the amine compound may show an insufficient effect of promoting the decomposition of organohalogen compounds because of a small amount of the amine compound contained in the catalyst. When the content of the amine compound is more than 10 parts by weight, the organohalogen compound-decomposition activity thereof may lower because of a small amount of the iron compound particles contained in the composite catalyst.

The organohalogen compound-decomposition catalyst of the present invention exhibits a catalytic activity capable of decomposing preferably not less than 50%, more preferably not less than 55%, still more preferably not less than 60% of monochlorobenzene when measured by the following method. That is, 50 mg of the organohalogen compound-decomposition catalyst is heat-treated at 300° C. for 60 minutes in air and then instantaneously contacted with $5.0 \times 10^{-7}$ mol of monochlorobenzene at 300° C. at a hourly space velocity of 150,000 $h^{-1}$ in an inert gas atmosphere using a pulse catalytic reactor to determine the percentage of the monochlorobenzene decomposed. Incidentally, the catalytic activity obtained by the above is substantially equal to a value when measured by the method: 50 mg of a composite material produced from iron oxide particles obtained by heat-treating the iron compound particles at 300° C. for 60 minutes in air and the amine compound, is instantaneously contacted with $5.0 \times 10^{-7}$ mol of monochlorobenzene at 300° C. at a hourly space velocity of 150,000 $h^{-1}$ in an inert gas atmosphere using a pulse catalytic reactor.

When the catalytic activity of the organohalogen compound-decomposition catalyst for the decomposition of monochlorobenzene is less than 50%, it is difficult to effectively decompose the organohalogen compounds.

In general, since monochlorobenzene is a typical one of the organohalogen compounds and is also known as a precursor of dioxin, the catalytic activity for the decomposition of monochlorobenzene is regarded as an index of the catalytic activity for the decomposition of the organohalogen compounds such as dioxins. Meanwhile, the decomposition percentage (conversion) of monochlorobenzene is represented by the following formula:

Conversion (%)=[1-(amount of monochlorobenzene detected after reaction/amount of monochlorobenzene initially charged)]×100

Next, the process for producing the organohalogen compound-decomposition catalyst of the present invention is described.

First, the process for producing the iron compound used in the present invention is described.

Among the iron compounds used in the present invention, the acicular-shaped, a spindle-shaped or a rice-grain-shaped goethite particles and granular-shaped magnetite particles may be produced, for example, by passing an oxygen-containing gas such as air through a suspension containing a ferrous-containing precipitate such as hydroxides of iron or iron carbonates which are obtained by reacting a ferrous salt with at least one compound selected from the group consisting of alkali hydroxides, alkali carbonates and ammonia.

Among the iron compounds used in the present invention, the hematite particles may be produced, for example, by heat-dehydrating or heat-treating the above obtained goethite particles or magnetite particles at a temperature of 200 to 800° C. in air; the magnetite particles may be produced, for example, by heat-reducing the above obtained goethite particles or hematite particles at a temperature of 300 to 600° C. in a reducing atmosphere; and the maghemite particles may be produced, for example, by heat-oxidizing the above obtained magnetite particles in a temperature of 200 to 600° C. in air.

In the production of the iron compound used in the present invention, it is necessary to restrict the contents of phosphorus, sulfur and sodium as catalyst poisons to not more than the above-mentioned predetermined amounts. More specifically, as the ferrous iron salt solution, there may be preferably used those having low contents of phosphorus, sulfur and the like as catalyst poisons. In addition, the contents of phosphorus, sulfur and sodium are preferably reduced by avoiding the use of sodium hexametaphosphate or the like usually added as a sintering preventive upon heat-calcination step, and by removing sulfate ions derived from the raw ferrous materials or sodium ions derived from raw alkali materials by means of purification treatments such as washing with water or the like.

Meanwhile, the iron compound particles may be previously deaggregated in order to reduce the apparent density of the obtained composite catalyst.

The composite catalyst composed of the iron compound particles and the amine compound may be produced by dry-mixing the iron compound particles with the amine compound using mixers such as a sand mill, a Henschel mixer and a Nauter mixer, or pulverizers such as a fine mill and a pin mill.

In the above dry-mixing treatment, a solvent such as water or alcohol (e.g. ethanol or isopropyl alcohol) may be present therein, if required, in order to improve a wettability of the particles. When any solvent is used, it is preferred that the solvent be evaporated by heating or under reduced pressure after the dry-mixing treatment.

The above dry-mixing treatment is preferably conducted under the following conditions.

In case of using the sand mill, the dry-mixing is conducted at a linear load of 5 to 50 Kg for 15 to 90 minutes.

In case of using the Henschel mixer, the dry-mixing is conducted at a temperature of 10 to 100° C. and a stirring speed of 500 to 3,000 rpm for 1 to 30 minutes.

In case of using the Nauter mixer, the dry-mixing is conducted at a rotating velocity of 25 to 200 rpm and a revolving velocity of 1 to 5 rpm for 15 to 60 minutes.

In case of using the fine mill or pin mill, the milling or dry-mixing is conducted at a stirring speed of 1,000 to 10,000 rpm while adding the amine compound to the iron compound particles.

The thus obtained composite particles constituting the organohalogen compound-decomposition catalyst of the present invention have such a configuration that the amine compound is carried on a part of the surface of each iron compound particle.

Next, the method for treating the organohalogen compound-containing soil or ash is described.

In the treating method of the present invention, the organohalogen compound-containing soil or ash and the organohalogen compound-decomposition catalyst are first mixed together, and then heat-treated.

Thus, in the present invention, the soil or ash is previously mixed with the organohalogen compound-decomposition catalyst. The mixing may be conducted by an ordinary dry-mixing method using a sand mill, a Henschel mixer, a concrete mixer and a Nauter mixer; a semi-dry-mixing method using the above-mentioned mixers as well as a single-screw or twin-screw kneader-type mixer in which water may be added thereto, if required; or the like. The resultant mixture may be further subjected to compression-molding or the like molding method in order to enhance the contact efficiency between the organohalogen compound-decomposition catalyst and the ash or soil to be treated.

The amount of the organohalogen compound-decomposition catalyst added is preferably 0.1 to 100 parts by weight, more preferably 1.0 to 50 parts by weight, still more preferably 1.0 to 30 parts by weight based on 100 parts by weight of the materials to be treated. When the amount of the organohalogen compound-decomposition catalyst added is less than 0.1 part by weight, the aimed dioxin-decomposition effect of the present invention cannot be sufficiently obtained. When the amount of the organohalogen compound-decomposition catalyst added is more than 100 parts by weight, the aimed effect is already saturated. Therefore, the use of such a large amount of the organohalogen compound-decomposition catalyst is unnecessary and meaningless.

The above heat-treatment may be conducted in air, an oxygen-containing gas or an inert gas atmosphere, within a closed container or the like, though not particularly restricted. It is possible to enhance the oxidative decomposition efficiency, by conducting the heat-treatment under an oxygen-containing gas flow.

The treating temperature may be varied according to the reaction time, and is preferably 150 to 600° C., more preferably 200 to 400° C. When the treating temperature is less than 150° C., the decomposition activity of the organohalogen compound-decomposition catalyst may be deteriorated. When the treating temperature is more than 600° C., although the organohalogen compounds can be decomposed, the effect of decomposing the organohalogen compounds cannot be enhanced to such a high level as estimated from a large energy required for the heating.

The heat-treatment of the present invention may be conducted using a continuous-type or batch-type rotary kiln, multiple-hearth furnace or a batch continuous-type pressure furnace. Among them, the use of the continuous-type or batch-type rotary kiln, multiple-hearth furnace is preferred.

When the organohalogen compound-containing soil or ash is treated by the process of the present invention, it is possible to reduce the organohalogen compound content in the soil or ash up to not more than 20%, preferably not more than 17%, more preferably not more than 10% of the organohalogen compound content in untreated soil or ash.

In case of treating soil or ash with the specific organohalogen compound-decomposition catalyst of the present invention, the organohalogen compounds contained in the soil or ash can be effectively and economically decomposed.

The reason why the organohalogen compounds contained in the soil or ash can be effectively decomposed, is considered as follows. That is, it is considered that the organohalogen compound-decomposition catalyst can exhibit a high catalytic activity for the decomposition of organohalogen compounds, and can be sufficiently contacted with the soil or ash.

The reason why the organohalogen compound-decomposition catalyst can exhibit a high catalytic activity for the decomposition of organohalogen compounds, is considered as follows. That is, it is considered that the iron compound itself can exhibit an excellent decomposition activity for the organohalogen compounds; the amine compound carried on a part of the surface of each iron compound particle can accelerate the adsorption of the organohalogen compounds thereonto; and both the iron compound and the amine compound can be contacted with each other, so that the decomposition reaction of the organohalogen compounds adsorbed by the amine compound can be accelerated. Further, it is considered that the amine compound can accelerate not only the adsorption of the organohalogen compounds but also the dechlorination reaction thereof.

Also, since the organohalogen compound-decomposition catalyst of the present invention has a low apparent density, the soil or ash to be treated can be readily mixed therewith, and the resultant mixture can be kept under a close contact condition.

Thus, the process for treating the organohalogen compound-containing soil or ash according to the present invention, can effectively decompose dioxins or dioxin precursors and, therefore, is suitable as the process for treating the soil or ash.

EXAMPLES

The present invention is described in more detail by Examples and Comparative Examples, but the Examples are only illustrative and, therefore, not intended to limit the scope of the present invention.

Various properties were measured by the following methods.

(1) The average particle size of the iron compound particles and the composite catalyst was expressed by the average of values measured from an electron micrograph. The specific surface area of the iron compound particles and the composite catalyst was expressed by the value measured by a BET method. The apparent density ($\rho a$) of the iron compound particles and the composite catalyst was expressed by the value measured by the method defined in JIS K5101.

(2) The contents of phosphorus and sodium contained in the iron compound particles and the composite catalyst were expressed by the values measured by an inductively coupled plasma atomic emission spectrometer (SPS-4000 Model, manufactured by Seiko Denshi Kogyo Co., Ltd.).

(3) The content of sulfur contained in the iron compound particles and the composite catalyst was expressed by the value measured by a Carbon-Sulfur Analyzer (EMIA-2200 Model, manufactured by Horiba Seisakusho Co., Ltd.).

(4) The catalyst property of the composite catalyst was measured by the following method.

That is, 50 mg of the composite catalyst was heat-treated at 300° C. for 60 minutes in air and then instantaneously contacted with $5.0 \times 10^{-7}$ mol of monochlorobenzene at 300° C. at an hourly space velocity of 150,000 $h^{-1}$ in an inert gas atmosphere using a pulse catalytic reactor. The catalyst property of the composite catalyst is determined by measuring the amount of monochlorobenzene decomposed in the above process.

The pulse catalytic reactor used above is constituted by a reactor portion and a gas chromatography portion which is constituted by Gas Chromatography-Mass Spectroscopy GC/MSQP-5050 (manufactured by Shimadzu Co., Ltd.).

Meanwhile, the evaluation method used herein was conducted by referring to methods described in the literatures (e.g., R. J. Kobes, et al, "J. Am. Chem. Soc.", 77, 5860 (1955) or "Experimental Chemistry II-Reaction and Velocity" edited by Chemical Society of Japan and published by Maruzen, Tokyo (1993)).

Example 1

<Iron Compound Particles>

As the iron compound particles 1, there were used spindle-shaped goethite particles having an average particle size of 0.25 μm, a phosphorus content of 0.002% by weight, a sulfur content of 0.05% by weight, a sodium content of 0.08% by weight and a BET specific surface area of 85 m²/g.

When measured by the above evaluation method, the goethite particles exhibited a monochlorobenzene decomposition percentage at a temperature of 300° C. of 32%.

<Production of Organohalogen Compound-Decomposition Catalyst>

1.5 kg of the above spindle-shaped goethite particles and 75 g of triethanolamine (boiling point: 360° C.)(5.0% by weight based on the weight of the goethite particles) were dry-mixed together at a temperature of 50° C. for 5 minutes in a Henschel mixer (nominal capacity: 10 liters) operated at 1,440 rpm, thereby obtaining goethite particles carrying triethanolamine thereon (amount of triethanolamine: 5.0% by weight based on the weight of the goethite particles).

The thus obtained triethanolamine-carrying goethite particles (composite particles 1) had an average particle size of 0.25 μm, a phosphorus content of 0.002% by weight, a sulfur content of 0.05% by weight, a sodium content of 0.08% by weight, a BET specific surface area of 78 m²/g and an apparent density of 0.43 g/ml, and exhibited a monochlorobenzene decomposition percentage at a temperature of 300° C. of 88% when measured by the above evaluation method.

<Decomposition Test for Dioxins>

400 g of fly ashes sampled beneath an electric dust collector in an incineration facility for municipal solid wastes (concentration of dioxins: 6.9 ng-TEQ/g) and 4 g of the above-prepared triethanolamine-carrying goethite particles (1.0 part by weight based on 100 parts by weight of the fly ashes to be treated) were dry-mixed together for 0.5 minute in a Henschel mixer (nominal capacity: 10 liters) operated at 1,440 rpm. Next, the resultant mixture was transferred into a batch-type rotary kiln having a capacity of 11 liters, and heat-treated therein at a temperature of 300° C. under an air flow (flow rate: 3 liters/min.) for 60 minutes.

<Measurement of Concentration of Dioxins>

The measurement of the concentration of dioxins contained in the fly ashes was conducted by the "Method for Measurement of Dioxins and Coplanar PCB" prescribed in Notification No. 6 of Ministry of Public Welfare. As a result, it was confirmed that the concentration of dioxins contained in the fly ashes was reduced to 0.32 ng-TEQ/g, namely 4.6% of the dioxin content of untreated fly ashes.

<Iron Compounds 2 to 7>

As the iron compound for the organohalogen compound-decomposition catalyst, iron compounds 2 to 7 were prepared. The iron compound 7 has an apparent density of 0.98 g/ml.

<Composite Catalysts 2 to 10>

As the organohalogen compound-decomposition catalyst, composite catalysts 2 to 10 were prepared. In the composite catalyst 7, silica gel having no catalytic activity in itself was used instead of the iron compound. Various properties of the obtained composite catalysts are shown in Table 2. The composite catalyst 10 was obtained by dry-mixing the iron compound 7 with aniline in Nauter mixer (rotating velocity: 30 rpm, revolving velocity: 2 rpm, mixing time: 5 minutes).

Examples 2 to 7, Comparative Examples 1 to 8 and Reference Examples 1 and 2

<Decomposition Test for Dioxins>

The same decomposition test for organohalogen compounds contained in ashes or soil as defined in Example 1 was conducted except that kind of ash, kind of composite catalyst, heat-treating atmosphere, heat-treating temperature and retention time were varied.

Various test conditions used in the decomposition test for dioxins and the results thereof are shown in Table 3. In Comparative Example 2, the heat-treatment was conducted using no catalyst. In Comparative Example 5, the heat-treatment was conducted using calcium hypophosphite (reagent produced by Kanto Kagaku Co., Ltd.; purity: not less than 80%) as a catalyst. Further, analyzed values of ashes before the treatment are also shown in Table 4 and analyzed values of soil before the treatment are also shown in Table 5.

TABLE 1

| Iron compound catalyst | Kind | Average particle size (μm) | BET specific surface area (m²/g) |
|---|---|---|---|
| Iron compound 1 | Goethite | 0.25 | 85 |
| Iron compound 2 | Goethite | 0.32 | 52 |
| Iron compound 3 | Hematite | 0.26 | 101 |
| Iron compound 4 | Goethite | 0.30 | 71 |
| Iron compound 5 | Hematite | 0.10 | 11 |
| Iron compound 6 | Hematite | 0.62 | 32 |
| Iron compound 7 | Hematite | 0.25 | 43 |

| Iron compound catalyst | Phosphorus content (wt. %) | Sulfur content (wt. %) | Sodium content (wt. %) | Catalyst property (Conversion of chlorobenzene at 300° C.) (%) |
|---|---|---|---|---|
| Iron compound 1 | 0.002 | 0.05 | 0.08 | 32 |
| Iron compound 2 | 0 | 0.01 | 0.05 | 28 |
| Iron compound 3 | 0.002 | 0.01 | 0.07 | 33 |
| Iron compound 4 | 0.49 | 0.08 | 0.18 | 2 |
| Iron compound 5 | 0.01 | 0.17 | 0.48 | 3 |
| Iron compound 6 | 0 | 0.38 | 0.09 | 2 |
| Iron compound 7 | 0.002 | 0.05 | 0.10 | 27 |

TABLE 2

| Composite catalysts | Iron compound and silica gel | Amine compound Kind | Boiling point (° C.) |
|---|---|---|---|
| Composite catalyst 1 | Iron compound 1 | Triethanolamine | 360 |
| Composite catalyst 2 | Iron compound 2 | Triethylenetetramine | 278 |
| Composite catalyst 3 | Iron compound 3 | Aniline | 184 |
| Composite catalyst 4 | Iron compound 1 | Triethanolamine | 360 |
| Composite catalyst 5 | Iron compound 4 | Triethanolamine | 360 |
| Composite catalyst 6 | Iron compound 5 | Triethylenetetramine | 278 |
| Composite catalyst 7 | Silica gel | Triethanolamine | 360 |
| Composite catalyst 8 | Iron compound 6 | Triethylenetetramine | 278 |
| Composite | Iron | Isopropylamine | 32 |

TABLE 2-continued

| | | | |
|---|---|---|---|
| catalyst 9 | compound 2 | | |
| Composite catalyst 10 | Iron compound 7 | Aniline | 184 |

| Composite catalysts | Amine compound Amount of amine compound carried (percentage based on iron compound or silica gel) (wt. %) | Composite catalyst Average particle size (μm) | Composite catalyst BET specific surface area (m²/g) |
|---|---|---|---|
| Composite catalyst 1 | 5.0 | 0.25 | 78 |
| Composite catalyst 2 | 1.0 | 0.32 | 51 |
| Composite catalyst 3 | 0.1 | 0.26 | 101 |
| Composite catalyst 4 | 0.02 | 0.25 | 84 |
| Composite catalyst 5 | 1.0 | 0.30 | 70 |
| Composite catalyst 6 | 5.0 | 0.10 | 10 |
| Composite catalyst 7 | 5.0 | 3.5 | 210 |
| Composite catalyst 8 | 3.0 | 0.62 | 29 |
| Composite catalyst 9 | 5.0 | 0.32 | 48 |
| Composite catalyst 10 | 5.0 | 0.25 | 40 |

| Composite catalysts | Composite catalyst Phosphorus content (wt. %) | Composite catalyst Sulfur content (wt. %) | Composite catalyst Sodium content (wt. %) |
|---|---|---|---|
| Composite catalyst 1 | 0.002 | 0.05 | 0.08 |
| Composite catalyst 2 | 0 | 0.01 | 0.05 |
| Composite catalyst 3 | 0.002 | 0.01 | 0.07 |
| Composite catalyst 4 | 0.002 | 0.05 | 0.08 |
| Composite catalyst 5 | 0.49 | 0.08 | 0.18 |
| Composite catalyst 6 | 0.01 | 0.17 | 0.48 |
| Composite catalyst 7 | — | — | — |
| Composite catalyst 8 | 0 | 0.38 | 0.09 |
| Composite catalyst 9 | 0 | 0.01 | 0.05 |
| Composite catalyst 10 | 0.002 | 0.05 | 0.10 |

| Composite catalysts | Composite catalyst Apparent density (g/ml) | Composite catalyst Catalyst property (Conversion of chlorobenzene at 300° C.) (%) |
|---|---|---|
| Composite catalyst 1 | 0.43 | 88 |
| Composite catalyst 2 | 0.52 | 83 |
| Composite catalyst 3 | 0.39 | 79 |
| Composite catalyst 4 | 0.44 | 70 |
| Composite catalyst 5 | 0.58 | 18 |
| Composite catalyst 6 | 0.95 | 11 |
| Composite catalyst 7 | — | 10 |
| Composite catalyst 8 | 0.49 | 12 |
| Composite catalyst 9 | 0.51 | 29 |
| Composite catalyst 10 | 0.92 | 21 |

TABLE 3

| Examples, Comparative Examples and Reference Examples | Materials to be treated Kind | Materials to be treated Amount treated (g) | Catalyst Kind |
|---|---|---|---|
| Example 2 | Ash A | 400 | Composite catalyst 3 |
| Example 3 | Ash B | 400 | Composite catalyst 2 |
| Example 4 | Ash B | 400 | Composite catalyst 1 |
| Example 5 | Ash C | 400 | Composite catalyst 2 |
| Example 6 | Ash C | 400 | Composite catalyst 4 |
| Example 7 | Soil D | 400 | Composite catalyst 1 |
| Comparative Example 1 | Ash A | 400 | Composite catalyst 5 |
| Comparative Example 2 | Ash B | 400 | — |
| Comparative Example 3 | Ash C | 400 | Composite catalyst 6 |
| Comparative Example 4 | Ash C | 400 | Composite catalyst 7 |
| Comparative Example 5 | Ash A | 400 | Calcium hypophosphite |
| Comparative Example 6 | Ash A | 400 | Composite catalyst 8 |
| Comparative Example 7 | Ash B | 400 | Composite catalyst 9 |
| Comparative Example 8 | Ash C | 400 | Composite catalyst 10 |
| Reference Example 1 | Ash A | 400 | Iron compound 1 |
| Reference Example 2 | Ash B | 400 | Iron compound 3 |

| Examples, Comparative Examples and Reference Examples | Catalyst Amount of catalyst (g) | Catalyst Amount based on 100 wt. parts of ash (wt. part) | Atmosphere (flow rate) |
|---|---|---|---|
| Example 2 | 20 | 5 | Air (1 liter/min.) |
| Example 3 | 40 | 10 | $N_2$ (inert gas) (10 liter/min.) |
| Example 4 | 100 | 25 | Air (3 liter/min.) |
| Example 5 | 20 | 5 | Air (0.1 liter/min.) |
| Example 6 | 10 | 2.5 | Closed system |
| Example 7 | 20 | 5 | Air (1 liter/min.) |
| Comparative Example 1 | 20 | 5 | Air (3 liter/min.) |
| Comparative Example 2 | 0 | 0 | Air (10 liter/min.) |
| Comparative | 20 | 5 | Closed system |

TABLE 3-continued

| | Heat-treating temperature (° C.) | Retention time (min.) | | |
|---|---|---|---|---|
| Example 3 Comparative Example 4 | 20 | 5 | Air (3 liter/min.) | |
| Comparative Example 5 | 40 | 10 | Air (3 liter/min.) | |
| Comparative Example 6 | 120 | 30 | Air (3 liter/min.) | |
| Comparative Example 7 | 20 | 5 | Air (1 liter/min.) | |
| Comparative Example 8 | 40 | 10 | Closed system | |
| Reference Example 1 | 20 | 5 | Air (3 liter/min.) | |
| Reference Example 2 | 40 | 10 | Closed system | |

| Examples, Comparative Examples and Reference Examples | Heat-treating temperature (° C.) | Retention time (min.) |
|---|---|---|
| Example 2 | 220 | 150 |
| Example 3 | 300 | 60 |
| Example 4 | 370 | 30 |
| Example 5 | 255 | 180 |
| Example 6 | 400 | 30 |
| Example 7 | 350 | 60 |
| Comparative Example 1 | 260 | 180 |
| Comparative Example 2 | 385 | 50 |
| Comparative Example 3 | 300 | 50 |
| Comparative Example 4 | 300 | 120 |
| Comparative Example 5 | 300 | 60 |
| Comparative Example 6 | 250 | 30 |
| Comparative Example 7 | 300 | 60 |
| Comparative Example 8 | 350 | 90 |
| Reference Example 1 | 300 | 60 |
| Reference Example 2 | 300 | 30 |

| Examples, Comparative Examples and Reference Examples | Concentration of dioxins (ng-TEQ/g) | Percentage of dioxin content after treatment based on initial dioxin content (%) |
|---|---|---|
| Example 2 | 1.2 | 17 |
| Example 3 | 0.014 | 0.25 |
| Example 4 | 0.0016 | 0.028 |
| Example 5 | 0.65 | 6.6 |
| Example 6 | 0.0021 | 0.021 |
| Example 7 | 0.0021 | 8.4 |
| Comparative Example 1 | 9.5 | 138 |
| Comparative Example 2 | 13 | 228 |
| Comparative Example 3 | 17 | 172 |
| Comparative Example 4 | 22 | 222 |
| Comparative Example 5 | 12 | 174 |
| Comparative Example 6 | 7.5 | 109 |
| Comparative Example 7 | 4.1 | 72 |
| Comparative Example 8 | 12.6 | 127 |
| Reference Example 1 | 3.9 | 57 |
| Reference Example 2 | 4.2 | 74 |

TABLE 4

| Samples | | Fly ash A | Fly ash B | Fly ash C |
|---|---|---|---|---|
| Concentration of dioxins | ng-TEQ/g | 6.9 | 5.7 | 9.9 |
| Content of each components | T—Fe (wt. %) | 0.4 | 3.4 | 1.9 |
| | T—Ca (wt. %) | 29.6 | 27.3 | 37.5 |
| | T—Pb (wt. %) | 0.11 | 0.05 | 0.16 |
| | T—Zn (wt. %) | 0.34 | 0.41 | 0.27 |
| | T—C (wt. %) | 4.05 | 2.53 | 3.19 |
| | T—S (wt. %) | 0.94 | 0.85 | 0.73 |
| Concentrations of respective components eluted | Fe (mg/l) | N.D.* | N.D.* | N.D.* |
| | Ca (wt. %) | 4.8 | 4.6 | 5.7 |
| | Pb (mg/l) | 18.3 | 2.5 | 11.4 |
| | Zn (mg/l) | 5.1 | 2.0 | 5.8 |
| | $Cr^{6+}$ (mg/l) | 0.068 | 0.002 | 0.009 |
| | $SO_4$ (wt. %) | 0.93 | 1.38 | 0.78 |
| | Se (mg/l) | 0.002 | 0.009 | 0.019 |
| | Cd (mg/l) | N.D.* | N.D.* | N.D.* |
| | Hg (mg/l) | N.D.* | 0.0006 | N.D.* |
| | As (mg/l) | N.D.* | 0.009 | N.D.* |

(Note) *"N.D." means "Not Detected", i.e., less than the lower detection limit.

TABLE 5

| Sample | | Soil D |
|---|---|---|
| Concentration of dioxins | ng-TEQ/g | 0.025 |
| Content of each components | T—Fe (wt. %) | 8.4 |
| | T—Si (wt. %) | 21.4 |
| | T—Al (wt. %) | 11.2 |
| Water (wt. %) | | 5.1 |

What is claimed is:

1. A process for treating an organohalogen compound-containing soil or ash, comprising:

mixing the organohalogen compound-containing soil or ash with an organohalogen compound-decomposition catalyst composed of a composite catalyst comprising an amine compound and iron compound particles, and having an average particle size of 0.01 to 2.0 μm, a phosphorus content of not more than 0.02% by weight, a sulfur content of not more than 0.3% by weight and a sodium content of not more than 0.3% by weight; and having an apparent density (ρa) of not more than 0.8 g/ml and a catalytic activity capable of decomposing not less than 50% by weight of monochlorobenzene when 50 mg of the composite catalyst is heat-treated at 300° C. for 60 minutes in air and then instantaneously contacted with $5.0 \times 10^{-7}$ mol of monochlorobenzene at 300° C. at a space velocity of 150,000 $h^{-1}$ in an inert gas atmosphere using a pulse catalytic reactor; and heat-treating the obtained mixture at a temperature of 150 to 600° C.

2. A process according to claim 1, wherein the amount of said organohalogen compound-decomposition catalyst used is 0.1 to 100 parts by weight based on 100 parts by weight of the organohalogen compound-containing soil or ash.

3. A process according to claim 1, wherein the heat-treatment is conducted under an air flow.

4. A process according to claim 1, wherein said iron compound particles have a BET specific surface area of 0.2 to 200 m²/g.

5. A process according to claim 1, wherein said amine compound is at least one compound selected from the group consisting of alkylamines, alkanolamines and cyclic amines, and has a boiling point of not less than 150° C.

6. A process according to claim 1, wherein said amine compound is contained in an amount of 0.01 to 10% by weight based on the weight of the iron compound particles.

7. A process according to claim 1, wherein the BET specific surface area of said organohalogen compound-decomposition catalyst is 0.2 to 200 m²/g.

8. A process according to claim 1, wherein the average particle size of said organohalogen compound-decomposition catalyst is 0.01 to 2.0 µm.

9. A process according to claim 1, wherein said soil or ash and said organohalogen compound-decomposition catalyst are mixed together by a dry mixing method using a sand mill, a Henschel mixer, a concrete mixer or a Nauter mixer, or by a semi-dry mixing method using a sand mill, a Henschel mixer, a concrete mixer, a Nauter mixer or a single-screw or twin-screw kneader-type mixer.

10. A process according to claim 1, wherein the heat-treatment is conducted using a continuous- or batch-type rotary kiln, multiple-hearth furnace or a batch continuous-type pressure furnace.

11. A process according to claim 1, wherein the iron compound particles have an average particle size of 0.01 to 2.0 µm, a phosphorus content of not more than 0.02% by weight, a sulfur content of not more than 0.3% by weight and a sodium content of not more than 0.3% by weight; and have a catalytic activity capable of decomposing not less than 20% by weight of monochlorobenzene when 50 mg of the iron compound particles heat-treated at 300° C. for 60 minutes in air are instantaneously contacted with $5.0 \times 10^{-7}$ mol of monochlorobenzene at 300° C. at a space velocity of 150,000 h$^{-1}$ in an inert gas atmosphere using a pulse catalytic reactor.

12. A process for treating an organohalogen compound-containing soil or ash, comprising:

mixing 100 parts by weight of the organohalogen compound-containing soil or ash with 0.1 to 100 parts by weight of an organohalogen compound-decomposition catalyst composed of a composite catalyst comprising 0.01 to 10 parts by weight of an amine compound having a boiling point of not less than 150° C., and 100 parts by weight of iron compound particles having an average particle size of 0.01 to 2.0 µm, a phosphorus content of not more than 0.02% by weight, a sulfur content of not more than 0.3% by weight and a sodium content of not more than 0.3% by weight; and having an average particle size of 0.01 to 2.0 µm, an apparent density (ρa) of not more than 0.8 g/ml and a catalytic activity capable of decomposing not less than 50% by weight of monochlorobenzene when 50 mg of the composite catalyst is heat-treated at 300° C. for 60 minutes in air and then instantaneously contacted with $5.0 \times 10^{-7}$ mol of monochlorobenzene at 300° C. at a space velocity of 150,000 h$^{-1}$ in an inert gas atmosphere using a pulse catalytic reactor; and heat-treating the obtained mixture at a temperature of 150 to 600° C. under an air flow.

13. A process for treating an organohalogen compound-containing soil or ash, comprising:

mixing 100 parts by weight of the organohalogen compound-containing soil or ash with 0.1 to 100 parts by weight an organohalogen compound-decomposition catalyst by a dry mixing method using a sand mill, a Henschel mixer, a concrete mixer or a Nauter mixer, or by a semi-dry mixing method using a sand mill, a Henschel mixer, a concrete mixer, a Nauter mixer or a single-screw or twin-screw kneader-type mixer;

said organohalogen compound-decomposition catalyst being composed of a composite catalyst comprising 0.01 to 10 parts by weight of an amine compound having a boiling point of not less than 150° C., and 100 parts by weight of iron compound particles having an average particle size of 0.01 to 2.0 µm, a phosphorus content of not more than 0.02% by weight, a sulfur content of not more than 0.3% by weight and a sodium content of not more than 0.3% by weight; and having an average particle size of 0.01 to 2.0 µm, an apparent density (ρa) of not more than 0.8 g/ml and a catalytic activity capable of decomposing not less than 50% by weight of monochlorobenzene when 50 mg of the composite catalyst is heat-treated at 300° C. for 60 minutes in air and then instantaneously contacted with $5.0 \times 10^{-7}$ mol of monochlorobenzene at 300° C. at a space velocity of 150,000 h$^{-1}$ in an inert gas atmosphere using a pulse catalytic reactor; and heat-treating the obtained mixture at a temperature of 150 to 600° C. under an air flow using a continuous- or batch-type rotary kiln, multiple-hearth furnace or a batch continuous-type pressure furnace.

* * * * *